United States Patent
Shimizu

[11] Patent Number: 5,831,252
[45] Date of Patent: Nov. 3, 1998

[54] METHODS OF BONDING TITANIUM AND TITANIUM ALLOY MEMBERS BY HIGH FREQUENCY HEATING

[75] Inventor: Takao Shimizu, Aichi, Japan

[73] Assignee: Daido Tokushuko Kabushiki Kaisha, Aichi, Japan

[21] Appl. No.: 617,579

[22] Filed: Mar. 19, 1996

[51] Int. Cl.$^6$ .............................. H05B 6/06; B23K 13/01
[52] U.S. Cl. .................... 219/603; 219/615; 219/617; 219/117.1; 228/111.5; 228/195
[58] Field of Search ...................... 219/603, 609, 219/610, 611, 615, 616, 617, 646, 117.1, 118; 228/110.1, 111.5, 194, 195

[56] References Cited

U.S. PATENT DOCUMENTS

| | | | |
|---|---|---|---|
| 3,591,917 | 7/1971 | Shira et al. | 228/190 |
| 3,851,138 | 11/1974 | Metcalfe et al. | 219/117 |
| 4,503,314 | 3/1985 | Kakimi et al. | 219/121 |
| 4,832,993 | 5/1989 | Coulon | 427/596 |
| 5,178,316 | 1/1993 | Block | 228/124.1 |
| 5,240,167 | 8/1993 | Ferte et al. | 228/114.5 |
| 5,617,991 | 4/1997 | Pramanick et al. | 228/193 |

*Primary Examiner*—Philip H. Leung
*Attorney, Agent, or Firm*—Majestic, Parsons, Siebert & Hsue P.C.

[57] ABSTRACT

Target members of titanium or a titanium alloy with melting point M are bonded together by first forming a bonding layer with melting point J lower than M on at least one of the bonding surfaces over which the target members are to be joined together. While the target members are pressed against each other over the bonding surfaces, end parts of the target members adjacent the bonding surfaces are heated to an intermediate temperature T such that $J<T<M$ and is kept at this intermediate temperature for a specified length of time to effect liquid-phase diffusion bonding. Alternatively, an insert member of titanium or a titanium alloy may be inserted between the bounding surfaces of the target members to form liquid-phase diffusion bonding by first forming bonding layers of the type described above on mutually opposite end surfaces of the insert member and then inserting the insert member between the target members.

20 Claims, 3 Drawing Sheets

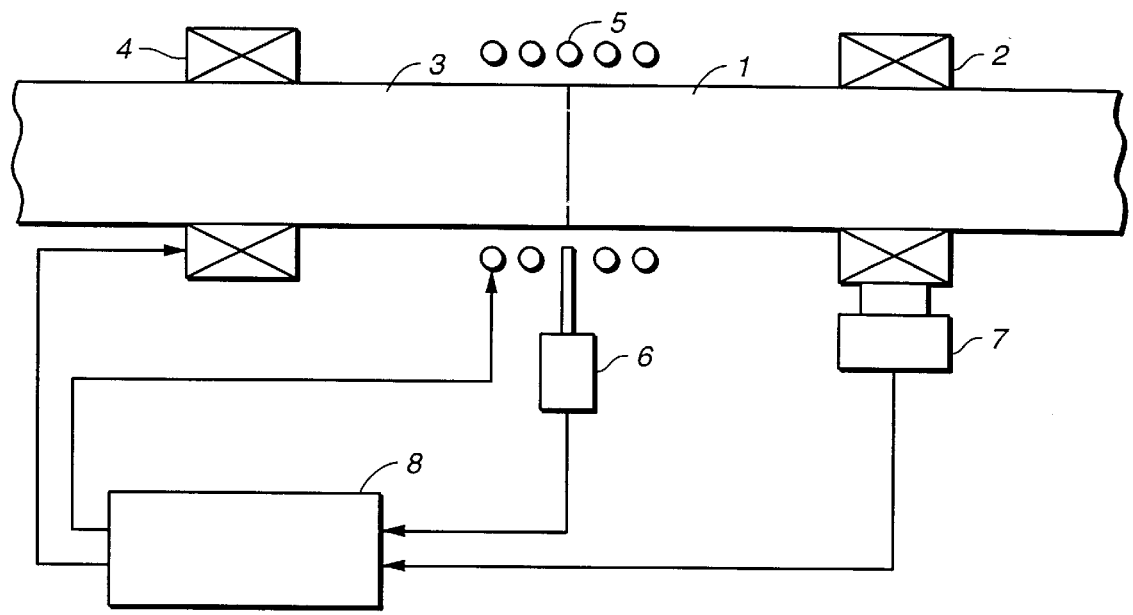
FIG._1
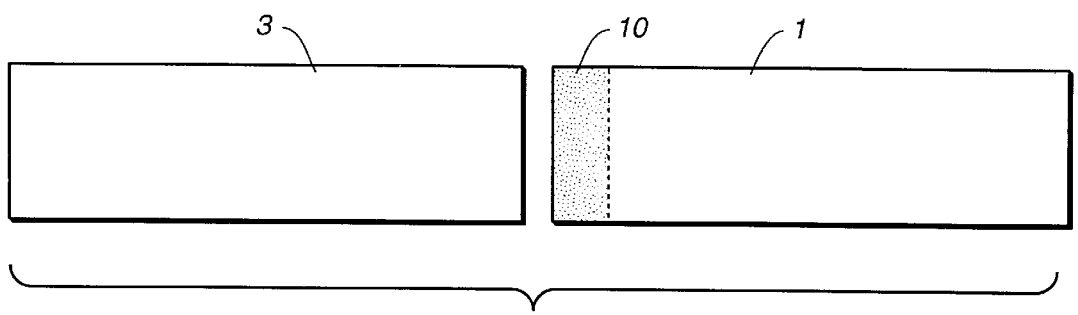
FIG._2
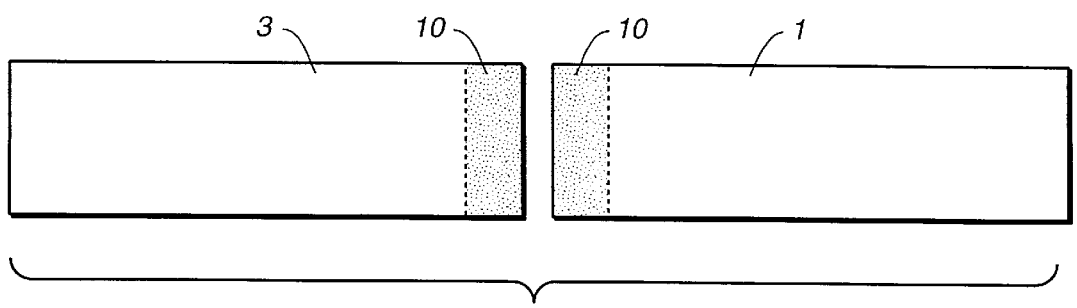
FIG._3

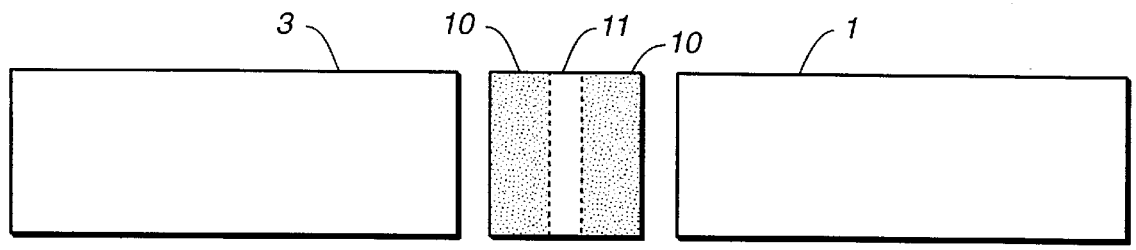
FIG._4
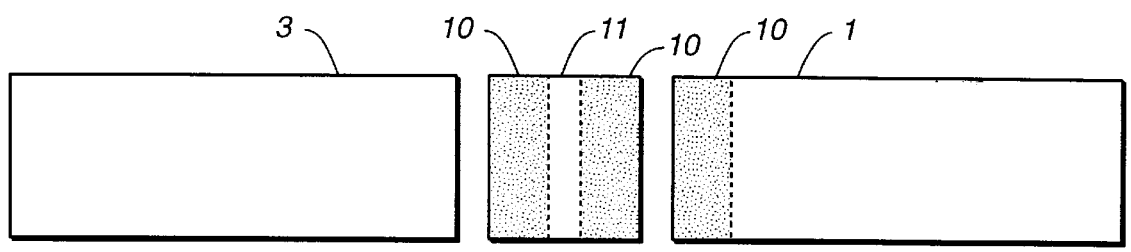
FIG._5
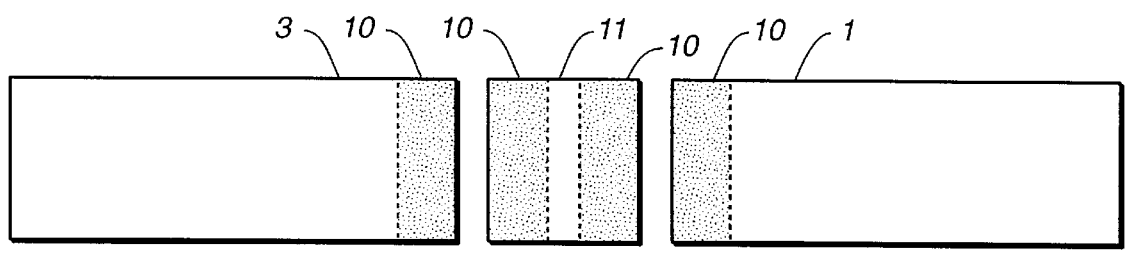
FIG._6
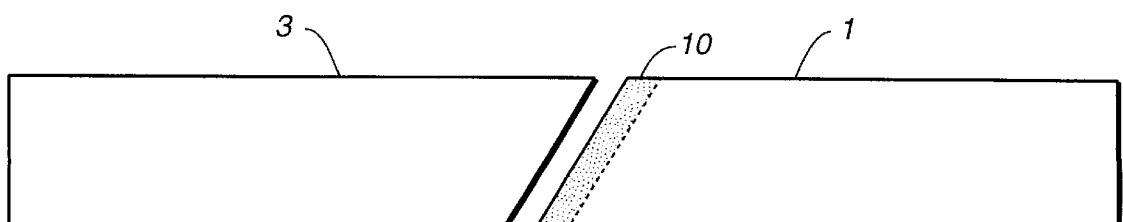
FIG._7

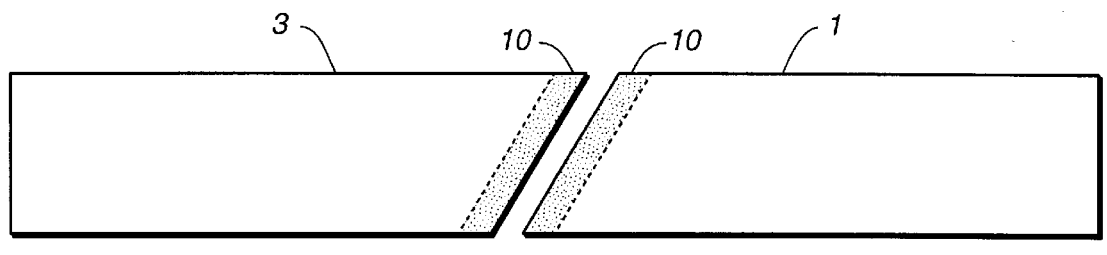
*FIG._8*
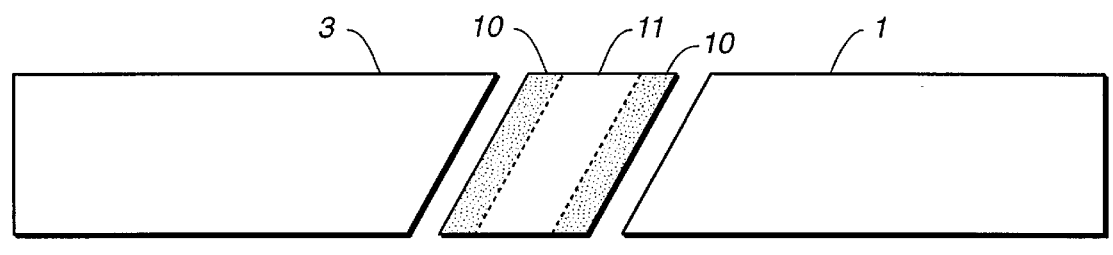
*FIG._9*
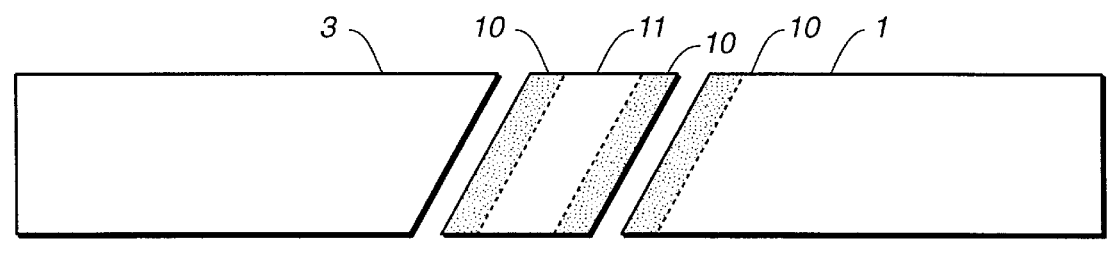
*FIG._10*
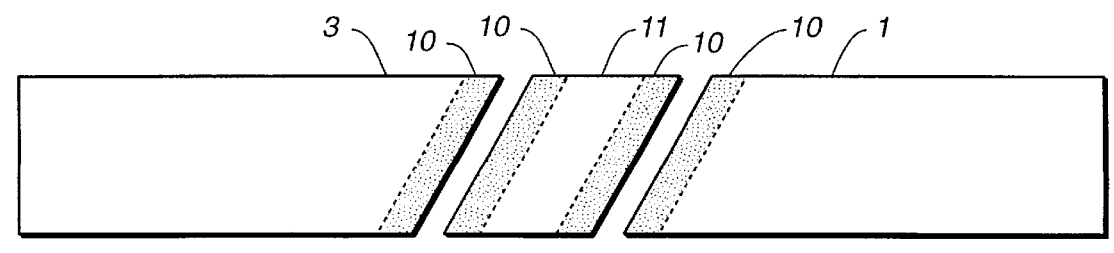
*FIG._11*

METHODS OF BONDING TITANIUM AND TITANIUM ALLOY MEMBERS BY HIGH FREQUENCY HEATING

BACKGROUND OF THE INVENTION

This invention relates to methods of bonding titanium and titanium alloy members, such as round bars and pipes made thereof, frequently used in chemical and petroleum industries.

Various methods such as arc welding, electron beam welding and frictional pressure welding are known as examples of method for bonding metallic members. If titanium or titanium alloy members are bonded together by such a prior art method, however, the strength at the joint is not sufficient, and the product thus obtained can enjoy only a limited use.

SUMMARY OF THE INVENTION

It is therefore an object of this invention in view of the above to provide methods of bonding members of titanium or a titanium alloy without causing weld cracks or material degradation, while providing a desired level of strength at the joint.

According to a method embodying this invention, with which the above and other objects can be accomplished, target members of titanium or a titanium alloy with melting point M are bonded together by first forming a so-called bonding layer comprising titanium or a titanium alloy with melting point J lower than M on at least one of the target members at which they are to be joined together. While the target members are pressed against each other over the bonding surfaces, the end parts of the target members adjacent the bonding surfaces are heated to an intermediate temperature T such that J<T<M and is kept at said intermediate temperature for a specified length of time to effect liquid-phase diffusion bonding. Alternatively, an insert member comprising titanium or a titanium alloy may be inserted between the bounding surfaces of the target members such that the latter can be bonded together not directly but with the insert member inserted in between. For effecting this kind of bonding according to this invention, bonding layers of the type described above are formed preliminarily on mutually opposite end surfaces of the insert member. After the insert member thus prepared is inserted between the bonding surfaces of the target members, the contacting parts are heated to an intermediate temperature and kept at this temperature for a specified length of time to effect liquid-phase diffusion bonding of the insert member with the target members which sandwich it.

BRIEF DESCRIPTION OF THE DRAWINGS

The accompanying drawings, which are incorporated in and form a part of this specification, illustrate embodiments of the invention and, together with the description, serve to explain the principles of the invention. In the drawings:

FIG. 1 is a schematic drawing of an apparatus embodying this invention; and

FIGS. 2–11 are each a side view of target members and bonding layers through which they are bonded by a method embodying this invention.

DETAILED DESCRIPTION OF THE INVENTION

This invention relates to a method of bonding together two members of titanium or a titanium alloy (herein referred to as target members), pressed against each other along a specified direction over mutually contacting surfaces (herein referred to as bonding surfaces). The method may be characterized as comprising the steps of preliminarily forming on either or both of the bonding surfaces of the target members a so-called bonding layer of titanium or a titanium alloy with melting point (indicated by letter J) which is lower than the melting point (indicated by letter M) of the target members, heating the end parts of the target members immediately adjacent the bonding surfaces across which they are bonded (herein referred to as the end parts) to an intermediate temperature T such that J<T<M, and holding it at this intermediate temperature T for a specified length of time for effecting liquid-phase diffusion bonding.

In another aspect, this invention relates to a method of bonding together such target members by providing an insert member, also of titanium or a titanium alloy, placed between the bonding surfaces of the target members. The method may be characterized as comprising the steps of preliminarily forming on each of mutually opposite end surfaces of the insert member a bonding layer of titanium or a titanium alloy with melting point (indicated again by letter J) which is lower than the melting point (indicated again by letter M) of the target members, sandwiching this insert member between the two target members such that their bonding surfaces each contact one of the end surfaces of the insert member, heating the end parts of the target members and the insert member immediately adjacent the bonding surfaces to an intermediate temperature T such that J<T<M, and holding it at this intermediate temperature T for a specified length of time for effecting liquid-phase diffusion bonding.

In either of these methods embodying this invention, the surface roughness Rmax of the bonding surfaces of the target members or the end surfaces of the insert member should preferably be 50 $\mu$m or less for enabling firmer bonding between the target members either directly or through the insert member. For a similar reason, the bonding surfaces should preferably be oblique (not perpendicular) to the direction in which the two target members are pressed together in the bonding process. In the method using an insert member, the end surfaces of the insert members should accordingly be made oblique so as to match the bonding surfaces of the target members.

The bonding layers according to this invention may be formed by any of known prior art methods, but ion plating, vapor deposition and sputtering are among preferred methods from the point of view of enabling firmer bonding between the target members either directly or through the insert member. For a similar reason, the bonding layer should preferably be of thickness in the range of 1–50 $\mu$m, consisting of Ti, Zr and either or both of Cu and Ni, their mass percentages being such that 20 mass % $\leq$Ti, 20 mass % $\leq$Zr, 40 mass % $\leq$(Ti+Zr)$\leq$90 mass % and 10 mass % $\leq$(Cu+Ni)$\leq$60 mass %.

Any known prior art method of liquid-phase diffusion bonding may be used in connection with the bonding according to this invention but the high-frequency induction heating method of frequency 200 KHz or less is preferred from the point of view of enabling firmer bonding between the target members either directly or through the insert member. For a similar reason, it is preferred to carry out the liquid-phase diffusion bonding inside an inactive gas with oxygen and nitrogen contents each less than 0.01 vol % or inside vacuum.

When end parts (whether formed where the bonding surfaces of two target members are bonded together or where the end surfaces of the insert member are bonded to the bonding surfaces of the target members) are heated to the temperature indicated by letter T, as described above, a liquid phase is temporarily generated in the bonding layer. If the end parts are subsequently kept at this temperature T for a specified length of time, diffusion of the elements takes place inside the liquid phase which was generated, its composition is thereby changed, and its melting point increases. This causes the liquid phase to solidify again, and a firmer bond is thereby formed between the target members either contacting directly or having the insert member in between.

As shown in FIG. 1, an apparatus embodying this invention may comprise, for example, a stationary chuck 2 for holding one of target members comprising titanium or a titanium alloy (indicated by numeral 1), a mobile chuck 4 for holding the other of the target members (indicated by numeral 3), a high-frequency induction coil 5 for heating specified parts (to be identified as the end parts) of the target members 1 and 3 for bonding, a radiative temperature detector 6 for measuring the temperature of the end parts, a pressure gauge 7 such as a load cell provided to the stationary chuck 2 for detecting the pressure at the end parts applied between the target members 1 and 3, and a control device 8 for controlling the heating by the high-frequency induction coil 5 and the pressure between the target members 1 and 3 caused by the mobile chuck 4. More in detail, the control device 8 is adapted to feed back the temperature value detected by the temperature detector 6 and the pressure value detected by the pressure gauge 7 to cause them to approach their respective preset values.

FIGS. 2–11 are each a side view of target members 1 and 3 comprising titanium or a titanium alloy about to be bonded together either directly through a bonding layer 10 formed on either or both of the target members 1 and 3 or through an insert member 11 comprising also titanium or a titanium alloy. As explained above, materials are so selected that the melting point J of the bonding layer 10 is lower than the melting point M of the target members 1 and 3 and the insert member 11.

FIGS. 2–6 show examples wherein the bonding surfaces of the target members 1 and 3 are perpendicular to the direction in which pressure is applied between the target members 1 and 3. FIGS. 4–6 show examples wherein an insert member 11 is used between the bonding surfaces of the target members 1 and 3. The end surfaces of the insert member 11 in these examples are also perpendicular to the direction of pressure. FIGS. 7–11 show examples wherein the bonding surfaces of the target members 1 and 3 are oblique to the direction in which pressure is applied between the target members 1 and 3. FIGS. 9–11 show examples wherein an insert member 11 is used between the bonding surfaces of the target members 1 and 3, with its end surfaces tilted to be oblique. FIGS. 2 and 7 are examples wherein a bonding layer 10 is formed on the bonding surface of only one of the target members (1). FIGS. 3 and 8 are examples where bonding layers 10 are formed on the bonding surfaces of both of the target members 1 and 3. FIGS. 4 and 9 are examples where bonding layers 10 are formed on both end surfaces of the insert member 11. FIGS. 5 and 10 are examples where bonding layers 10 are formed on the bonding surface of one of the target members (1) and both end surfaces of the insert member 11. FIGS. 6 and 11 are examples where bonding layers 10 are formed on the bonding surfaces of both target members 1 and 3 and on both end surfaces of the insert member 11. The target members 1 and 3, as well as the insert member 11 if it is used, are positioned inside the apparatus shown in FIG. 1 to heat the end parts to a specified bonding temperature T given by J<T<M and to keep the end parts at this temperature for a specified length of time to thereby effect liquid-phase diffusion bonding between the target members 1 and 3 either directly or with the insert member 11 therebetween.

Table 1 shows the results of a series of experiments wherein round bars of diameter 20 mm comprising titanium and a titanium alloy were used as samples. In all tests which are described hereinbelow, "sample" will mean both the target members to be bonded together directly or the target members and the insert member which is inserted between the target members to be bonded, depending on whether an insert member is used or not. Bonding layers 10 were formed by ion plating as shown in the figures indicated in the line entitled "Position". The test samples were heated to the indicated bonding temperature T (such that J<T<M) by a high-frequency induction heating method in a vacuum condition ($10^{-3}$ mmHg) while pressure of 4.9 MPa was applied, kept at this temperature T for 300 seconds to effect liquid-phase diffusion bonding and then subjected to a tensile test. In the experiments for Table 1, the surface roughness Rmax of the surfaces where a bonding layer was formed was all 2.5 $\mu$m. Throughout herein, the line marked "Example" indicates whether the sample was according to this invention (Test Example) or for comparison (Comp.), Composition A will mean that the bonding layer was an alloy Ti-40Zr-15Cu-10Ni, Composition B means Ti-35Zr-15Cu-15Ni and BM (base material) means the test sample. For indicating the position where each sample broke in the test for tensile strength (Position of Rupture), BS means "bonding surface", indicating relative weakness where the bonding took place.

In Table 1, Example No. 1 is a comparison example, having no bonding layer. Example No. 8 is another comparison example, not according to the invention in that the bonding temperature T=800° C. is lower than the melting point of the bonding layer J=830° C. The low tensile strength in Example No. 7 was probably because the bonding layer was thick (60 $\mu$m), causing insufficiency in diffusion into the base material. Table 1 shows that the thickness of the bonding layer should preferably be in the range of 1 $\mu$m to 50 $\mu$m.

Throughout herein, the following symbols will be used for indicating the results of evaluation: A for "Good because the bonding was strong and the rupture was in the base material"; B for "Not too bad because, although the rupture was at the bonding surface, the tensile strength was over 200 MPa and the elongation was greater than 10%", and C for "Poor because the rupture was at the bonding surface and either the tensile strength was less than 200 MPa or the elongation was less than 10%".

Table 2 shows results of another series of experiments wherein round bars of diameter 20 mm comprising titanium and a titanium alloy were used as samples. In the experiments for Table 2, however, the surface roughness Rmax of the surfaces where a bonding layer was formed was all 5.0 $\mu$m and bonding layers with different compositions were formed in order to examine their effects. The tensile strength tests on bonded connectors for Table 2 showed that it is preferable that the bonding layers consist of Ti, Zr and either or both of Cu and Ni and that their mass percentages be such that 20 mass % $\leq$Ti, 20 mass % $\leq$Zr, 40 mass % $\leq$(Ti+Zr) $\leq$90 mass % and 10 mass % $\leq$(Cu+Ni)$\leq$60 mass %.

In experiments for Table 3, as for Table 1, use was made of round bars of diameter 20 mm as test samples, and bonding layers of Ti-40Zr-15Cu-10Ni were formed by ion plating on both bonding surfaces as shown in FIG. 4. The bonding temperature T was 900° C., and the connected end parts were kept at this temperature for 300 seconds to form bonded connectors in a vacuum condition ($10^{-3}$ mmHg). High-frequency induction heating was effected for liquid-phase diffusion bonding by varying the frequency in the range of 400 KHz–3 KHz. The surface roughness Rmax of the surfaces where a bonding layer was formed was all 2.5 µm. Tensile strength tests for Table 3 show that there was a rupture at the bonding surface (BS) in the case of the sample No. 15 where the frequency was 400 KHz, indicating that the frequency of high-frequency induction heating should preferably be 200 KHz or less.

In experiments for Table 4, as for Table 1, use was made of round bars of diameter 20 mm comprising titanium or a titanium alloy as test samples. Bonding layers of Ti-35Zr-15Cu-15Ni and thickness 20 µm were formed as shown in FIG. 6. Bonded connectors for testing were produced by high-frequency induction heating with frequency 25 KHz to heat the end parts to a bonding temperature T of 900° C. and by holding the connected end parts at this temperature for 300 seconds while a pressure of 4.9 MPa was applied therebetween. The atmosphere for the liquid-phase diffusion bonding was varied to study theirs effects. The surface roughness Rmax of the surfaces where a bonding layer was formed was 12.5 µm. The results of tensile strength tests done on these bonded connectors are shown in Table 4, indicating that ruptures are likely to occur in the bonded surface area if the contents of oxygen and nitrogen in the atmosphere reach about 0.01 volume % and hence that the bonding should be carried out in an atmosphere with oxygen and nitrogen contents 0.01 volume % or less.

Table 5 shows results of tensile strength tests on bonded connectors produced, as in the tests for Table 1, by using round bars of titanium with diameter 20 mm as sample material and by effecting liquid-phase diffusion bonding in a vacuum condition as shown in FIGS. 2, 7, 8, 10 and 11. Sample No. 26 according to FIG. 2 has bonding surfaces oriented perpendicularly to the center lines of the round bars (that is, the direction of compression). Sample Nos. 27 and 28 according respectively to FIGS. 7 and 8 have bonding surfaces making 60° to the center lines, and samples Nos. 29 and 30 according respectively to FIGS. 10 and 11 have bonding surfaces making 75° to the center lines. The surface roughness Rmax of the surfaces where a bonding layer was formed was 2.5 µm. Table 5 shows that the bonding strength improves if the bonding surfaces are oblique.

Table 6 shows results of tensile strength tests on bonded connectors formed, as in tests for Table 1, by using round bars of titanium and titanium alloys with diameter 20 mm but by varying the composition of the sample material. Bonding layers of thickness 10 µm were formed on bonding surfaces by ion plating, and liquid-phase diffusion bonding was effected in a vacuum condition ($10^{-3}$ mmHg) by high-frequency (8 KHz) induction heating. The surface roughness Rmax of the bonding surfaces before the formation of bonding layers was 2.5 µm. Table 6 shows that the method according to this invention is effective not only in the case of titanium materials but also in cases of materials of different titanium alloys.

Table 7 shows results of tensile strength tests on bonded connectors formed, as in tests for Table 1, by using round bars of titanium and titanium alloys with diameter 20 mm but by varying the surface roughness Rmax of the bonding surfaces of target members before bonding layers are formed thereon and also by using different methods to form bonding layers. Liquid-phase diffusion bonding was effected in an atmosphere of pure Ar gas by high-frequency (10 KHz) induction heating. Table 7 shows that the surface roughness Rmax of the end surfaces to be bonded together should preferably be 50 µm or less and that ion plating (IP), vapor deposition (VD) and sputtering (SP) are effective methods for forming bonding layers.

Table 8 shows results of tensile strength tests on bonded connectors formed by using round pipes of titanium or a titanium alloy with outer diameter 100 mm and thickness 10 mm and by effecting high-frequency (10 KHz) induction heating for liquid-phase diffusion bonding in an atmosphere of pure argon. Table 8 shows that the method according to this invention is effective also for the bonding of pipes.

Table 9 shows results of tensile strength tests on bonded connectors formed by using round pipes of titanium with outer diameter 150 mm and thickness 10 mm and by effecting high-frequency (10 KHz) induction heating for liquid-phase diffusion bonding in an atmosphere of pure argon with varied thickness of bonding layers. Table 9 also shows that the method according to this invention is effective for bonding pipes together.

In summary, this invention makes it possible to obtain very strong bonds between target members of titanium and titanium alloys by means of liquid-phase diffusion bonding process and hence titanium and titanium alloy products which have superior mechanical and chemical properties and are easy to fabricate and assemble.

TABLE 1

| | No. | | | | | | | |
|---|---|---|---|---|---|---|---|---|
| | 1 | 2 | 3 | 4 | 5 | 6 | 7 | 8 |
| Example | Comp. | Test | Test | Test | Test | Test | Test | Comp. |
| Composition of Test Sample | Ti | Ti | Ti | Ti—6Al—4V | Ti—6Al—4V | Ti—6Al—4V | Ti | Ti |
| Bonding layer | | | | | | | | |
| Composition | — | A | A | A | B | A | B | A |
| Thickness (µm) | — | 20 | 25 | 50 | 10 | 1 | 60 | 30 |
| Melting Point (°C.) | — | 830 | 830 | 830 | 820 | 830 | 820 | 830 |
| Position (FIG.) | — | 2 | 3 | 4 | 5 | 6 | 3 | 3 |
| Bonding Temperature (°C.) | 900 | 900 | 900 | 900 | 900 | 900 | 900 | 800 |
| Test Results | | | | | | | | |

TABLE 1-continued

| | No. | | | | | | | |
|---|---|---|---|---|---|---|---|---|
| | 1 | 2 | 3 | 4 | 5 | 6 | 7 | 8 |
| Tensile Strength (MPa) | 204 | 376 | 374 | 1095 | 1096 | 1100 | 368 | 301 |
| Elongation (%) | 3 | 45 | 44 | 20 | 19 | 21 | 43 | 2 |
| Position of Rupture | BS | BM | BM | BM | BM | BM | BS | BS |
| Overall Evaluation | C | A | A | A | A | A | B | C |

TABLE 2

| | No. | | | | | |
|---|---|---|---|---|---|---|
| | 9 | 10 | 11 | 12 | 13 | 14 |
| Example Composition of Test Sample | Test Ti | Test Ti | Test Ti | Test Ti—6Al—4V | Test Ti | Test Ti |
| Bonding layer Composition (mass %) | | | | | | |
| Ti | 30 | 20 | 35 | 35 | 50 | 50 |
| Zr | 10 | 20 | 35 | 35 | 40 | 45 |
| Cu | 50 | 60 | 15 | 15 | 10 | 5 |
| Ni | 10 | 0 | 15 | 15 | 0 | 0 |
| Thickness (μm) | 20 | 20 | 20 | 20 | 20 | 20 |
| Melting Point (°C.) | 730 | 780 | 820 | 820 | 1030 | 1050 |
| Position (FIG.) | 3 | 3 | 3 | 3 | 3 | 3 |
| Bonding Temperature (°C.) | 900 | 900 | 900 | 900 | 1100 | 1100 |
| Test Results | | | | | | |
| Tensile Strength (MPa) | 294 | 380 | 373 | 1098 | 377 | 217 |
| Elongation (%) | 10 | 44 | 45 | 20 | 44 | 10 |
| Position of Rupture | BS | BM | BM | BM | BM | BS |
| Overall Evaluation | B | A | A | A | A | B |

TABLE 3

| | No. | | | | |
|---|---|---|---|---|---|
| | 15 | 16 | 17 | 18 | 19 |
| Example Composition of Test Sample | Test Ti | Test Ti | Test Ti | Test Ti | Test Ti |
| Frequency (KHz) | 400 | 200 | 100 | 25 | 3 |
| Test Results | | | | | |
| Tensile Strength (MPa) | 250 | 375 | 376 | 1097 | 379 |
| Elongation (%) | 10 | 44 | 44 | 21 | 43 |
| Position of Rupture | BS | BM | BM | BM | BM |
| Overall Evaluation | B | A | A | A | A |

TABLE 4

| | No. | | | | | |
|---|---|---|---|---|---|---|
| | 20 | 21 | 22 | 23 | 24 | 25 |
| Example Composition of Test Sample | Test Ti | Test Ti | Test Ti | Test Ti—6Al—4V | Test Ti | Test Ti |
| Atmosphere | | | | | | |
| Gas | Ar | Ar | He | Vacuum | Ar | Ar |
| O$_2$ (Vol %) | 0.10 | 0.01 | 0.005 | — | 0.005 | 0.01 |
| N$_2$ (Vol %) | 0.10 | 0.01 | 0.01 | — | 0.005 | 0.10 |
| Test Results | | | | | | |
| Tensile Strength (MPa) | 294 | 380 | 373 | 1098 | 377 | 217 |
| Elongation (%) | 10 | 44 | 45 | 20 | 44 | 10 |
| Position of Rupture | BS | BM | BM | BM | BM | BS |
| Overall Evaluation | B | A | A | A | A | B |

TABLE 5

| | No. | | | | |
|---|---|---|---|---|---|
| | 26 | 27 | 28 | 29 | 30 |
| Example Composition of Test Sample | Test Ti | Test Ti | Test Ti | Test Ti | Test Ti |
| Position of Bonding Layer (FIG.) | 2 | 7 | 8 | 10 | 11 |
| Angle of Joint Surface with Center Axis (Degree) | 90 | 60 | 60 | 75 | 75 |
| Test Results | | | | | |
| Tensile Strength (MPa) | 371 | 380 | 373 | 381 | 377 |
| Elongation (%) | 24 | 44 | 45 | 43 | 44 |
| Position of Rupture | BM | BM | BM | BM | BM |
| Overall Evaluation | A | A | A | A | A |

TABLE 6

| | No. | | |
|---|---|---|---|
| | 31 | 32 | 33 |
| Example Composition of Test Sample | Test Ti | Test Ti—6Al—4V | Test Ti—3Al—2V—S-REM |
| Bonding layer | | | |

TABLE 6-continued

| | No. | | |
|---|---|---|---|
| | 31 | 32 | 33 |
| Composition | A | B | B |
| Thickness (μm) | 10 | 10 | 10 |
| Position (FIG.) | 3 | 4 | 5 |
| Bonding Temperature (°C.) | 900 | 900 | 900 |
| Test Results | | | |
| Tensile Strength (MPa) | 377 | 1094 | 748 |
| Elongation (%) | 44 | 20 | 26 |
| Position of Rupture | BM | BM | BM |
| Overall Evaluation | A | A | A |

TABLE 7

| | No. | | | | |
|---|---|---|---|---|---|
| | 34 | 35 | 36 | 37 | 38 |
| Example Composition of Test Sample | Test Ti | Test Ti | Test Ti—6Al—4V | Test Ti—22V—4V | Test Ti |
| Surface Roughness Rmax (μm) | 2.5 | 12.5 | 25 | 50 | 100 |
| Bonding layer | | | | | |
| Method of Formation | VD | SP | IP | SP | VD |
| Composition | A | B | A | B | B |
| Thickness (μm) | 10 | 10 | 30 | 50 | 50 |
| Position (FIG.) | 2 | 3 | 4 | 5 | 3 |
| Bonding Temperature (°C.) | 900 | 900 | 900 | 900 | 900 |
| Test Results | | | | | |
| Tensile Strength (MPa) | 374 | 375 | 1102 | 768 | 355 |
| Elongation (%) | 43 | 45 | 21 | 28 | 11 |
| Position of Rupture | BM | BM | BM | BM | BS |
| Overall Evaluation | A | A | A | A | B |

TABLE 8

| | No. | | |
|---|---|---|---|
| | 39 | 40 | 41 |
| Example Composition of Test Sample | Test Ti | Test Ti—22Al—4V | Test Ti—6Al—4V |
| Surface Roughness Rmax (μm) | 12.5 | 12.5 | 25 |
| Bonding layer | | | |
| Method of Formation | IP | SP | VD |
| Composition | B | A | B |
| Thickness (μm) | 15 | 20 | 30 |
| Position (FIG.) | 2 | 4 | 6 |
| Bonding Temperature (°C.) | 900 | 900 | 900 |
| Test Results | | | |
| Tensile Strength (MPa) | 375 | 766 | 1097 |
| Elongation (%) | 41 | 29 | 20 |
| Position of Rupture | BM | BM | BM |

TABLE 8-continued

| | No. | | |
|---|---|---|---|
| | 39 | 40 | 41 |
| Rupture | | | |
| Overall Evaluation | A | A | A |

TABLE 9

| | No. | | | | |
|---|---|---|---|---|---|
| | 42 | 43 | 44 | 45 | 46 |
| Example Composition of Test Sample | Test Ti—3Al—2V | Test Ti—6Al—4V | Test Ti—6Al—4V | Test Ti—22V—4Al | Test Ti—6Al—4V |
| Surface Roughness Rmax (μm) | 5 | 5 | 5 | 5 | 5 |
| Bonding layer | | | | | |
| Method of Formation | VD | VD | VD | VD | VD |
| Composition | A | A | A | B | A |
| Thickness (μm) | 0.01 | 0.05 | 5 10 (BM) | 10 10 (BM) | 15 |
| Position (FIG.) | 4 | 4 | 5 | 6 | 4 |
| Bonding Temperature (°C.) | 900 | 900 | 900 | 900 | 900 |
| Test Results | | | | | |
| Tensile Strength (MPa) | 744 | 1097 | 1100 | 767 | 335 |
| Elongation (%) | 27 | 21 | 21 | 29 | 10 |
| Position of Rupture | BM | BM | BM | BM | BS |
| Overall Evaluation | A | A | A | A | B |

What is claimed is:

1. A method of bonding together bonding surfaces of target members of titanium or a titanium alloy with melting point M, said method comprising the steps of preliminarily forming a bonding layer comprising titanium or a titanium alloy with melting point J lower than M on at least one of said bonding surfaces, heating end parts of said target members adjacent said bonding surfaces to an intermediate temperature T such that J<T<M and thereafter effecting liquid-phase diffusion bonding of said bonding surfaces of target members by keeping said end parts directly adjacent each other at said intermediate temperature for a specified length of time.

2. The method of claim 1 wherein said bonding surfaces are oblique to direction in which said target members are compressed toward each other.

3. The method of claim 1 wherein surface roughness Rmax of said bonding surface on which said bonding layer is formed is 50 μm or less.

4. The method of claim 3 wherein said bonding layer is formed by a process selected from the group consisting of ion plating, vapor deposition and sputtering.

5. The method of claim 4 wherein said bonding layer has thickness 1–50 μm.

6. The method of claim 5 wherein said bonding layer consists of Ti, Zr, Cu and Ni, mass percentages thereof being such that 20 mass % ≦Ti, 20 mass % ≦Zr, 40 mass % ≦(Ti+Zr)≦90 mass % and 10 mass % ≦(Cu+Ni)≦60 mass %.

7. The method of claim 6 wherein said liquid-phase diffusion bonding is effected by high-frequency diffusion heating with frequency equal to or less than 200 KHz.

8. The method of claim 7 wherein said liquid-phase diffusion bonding is effected in an inactive atmosphere containing oxygen and nitrogen by less than 0.01 volume %.

9. The method of claim 5 wherein said liquid-phase diffusion bonding is effected by high-frequency diffusion heating with frequency equal to or less than 200 KHz.

10. The method of claim 9 wherein said liquid-phase diffusion bonding is effected in an inactive atmosphere containing oxygen and nitrogen by less than 0.01 volume %.

11. A method of bonding together bonding surfaces of target members of titanium or a titanium alloy, said method comprising the steps of preliminarily forming a bonding layer comprising titanium or a titanium alloy with melting point J on both of mutually opposite end surfaces of an insert member comprising titanium or a titanium alloy with melting point M such that J<M, placing said insert member between bonding surfaces of said target members, thereafter heating end parts of said insert member adjacent said both end surfaces to an intermediate temperature T such that J<T<M and effecting liquid-phase diffusion bonding of said insert member with said target members by keeping said end parts at said intermediate temperature for a specified length of time.

12. The method of claim 11 wherein said bonding surfaces and said end surfaces of said insert member are oblique to direction in which said target members are compressed toward each other.

13. The method of claim 11 wherein surface roughness Rmax of said end surfaces of said insert member on which said bonding layer is formed is 50 $\mu$m or less.

14. The method of claim 13 wherein said bonding layer is formed by a process selected from the group consisting of ion plating, vapor deposition and sputtering.

15. The method of claim 14 wherein said bonding layer has thickness 1–50 $\mu$m.

16. The method of claim 15 wherein said bonding layer consist of Ti, Zr, Cu and Ni, mass percentages thereof being such that 20 mass % $\leq$Ti, 20 mass % $\leq$Zr, 40 mass % $\leq$(Ti+Zr)$\leq$90 mass % and 10 mass % $\leq$(Cu+Ni)$\leq$60 mass %.

17. The method of claim 16 wherein said liquid-phase diffusion bonding is effected by high-frequency diffusion heating with frequency equal to or less than 200 KHz.

18. The method of claim 17 wherein said liquid-phase diffusion bonding is effected in an inactive atmosphere containing oxygen and nitrogen by less than 0.01 volume %.

19. The method of claim 15 wherein said liquid-phase diffusion bonding is effected by high-frequency diffusion heating with frequency equal to or less than 200 KHz.

20. The method of claim 19 wherein said liquid-phase diffusion bonding is effected in an inactive atmosphere containing oxygen and nitrogen by less than 0.01 volume %.

* * * * *